United States Patent
Xiao et al.

(10) Patent No.: US 11,387,695 B2
(45) Date of Patent: Jul. 12, 2022

(54) TANGENTIAL MOTOR, TANGENTIAL MOTOR ROTOR AND ROTOR IRON CORE THEREOF

(71) Applicant: Gree Green Refrigeration Technology Center Co., Ltd. of Zhuhai, Guangdong (CN)

(72) Inventors: Yong Xiao, Guangdong (CN); Yusheng Hu, Guangdong (CN); Jing Wang, Guangdong (CN); Bin Chen, Guangdong (CN); Zeyin Mi, Guangdong (CN)

(73) Assignee: GREE GREEN REFRIGERATION TECHNOLOGY CENTER CO., LTD. OF ZHUHAI, Guangdong (CN)

( * ) Notice: Subject to any disclaimer, the term of this patent is extended or adjusted under 35 U.S.C. 154(b) by 116 days.

(21) Appl. No.: 16/636,626

(22) PCT Filed: Dec. 28, 2017

(86) PCT No.: PCT/CN2017/119434
§ 371 (c)(1),
(2) Date: Feb. 4, 2020

(87) PCT Pub. No.: WO2019/029109
PCT Pub. Date: Feb. 14, 2019

(65) Prior Publication Data
US 2020/0381965 A1    Dec. 3, 2020

(30) Foreign Application Priority Data
Aug. 9, 2017 (CN) .......................... 201710676617.9

(51) Int. Cl.
*H02K 1/279* (2022.01)
*H02K 29/03* (2006.01)
*H02K 1/276* (2022.01)

(52) U.S. Cl.
CPC ........... *H02K 1/2773* (2013.01); *H02K 29/03* (2013.01); *H02K 2213/03* (2013.01)

(58) Field of Classification Search
None
See application file for complete search history.

(56) References Cited

U.S. PATENT DOCUMENTS 6,946,766 B2 * 9/2005 Gary ...................... H02K 1/276
310/156.37

FOREIGN PATENT DOCUMENTS

CN         1196597 A  * 10/1998  ........... H02K 1/2766
CN       106160281 A  * 11/2016
(Continued)

OTHER PUBLICATIONS

Extended European Search Report for European Application No. 17920956.4 dated Jun. 26, 2020 (10 pages).
(Continued)

*Primary Examiner* — Quyen P Leung
*Assistant Examiner* — Christopher Stephen Schaller
(74) *Attorney, Agent, or Firm* — Brandon V. Zuniga; James R. Gourley; Carstens & Cahoon, LLP (57) ABSTRACT

A tangential motor, a tangential motor rotor and a rotor iron core thereof. The rotor iron core includes a rotor body and permanent magnet slots provided on the rotor body, a rotor magnetic pole between two adjacent permanent magnet slots being provided with a fixing hole for fixing a rotor punched segment and a flux isolating hole; the flux isolating hole is located at an outer side of the fixing hole in a radial direction of the rotor body, a width of the flux isolating hole (12) smoothly increases in a direction from the outer side of the rotor body to a center of a circle thereof. The rotor iron core reduces vibration noise of the motor, and improves efficiency of the motor.

20 Claims, 7 Drawing Sheets

(56) References Cited

FOREIGN PATENT DOCUMENTS

| EP | 2372873 A2 | 10/2011 | |
|----|----|----|----|
| GN | 106451849 A | 2/2017 | |
| WO | WO-2013135257 A2 * | 9/2013 | ............. H02K 1/276 |
| WO | WO-2014090050 A1 * | 6/2014 | ............... H02K 1/28 |
| WO | 2015185847 A2 | 12/2015 | |
| WO | WO-2017077580 A1 * | 5/2017 | ............ F25B 31/026 |
| WO | WO-2017105147 A1 * | 6/2017 | ............... H02K 1/24 |

OTHER PUBLICATIONS

English machine translation of CN 106451849A published Feb. 22, 2017 (11 pages).

\* cited by examiner

TANGENTIAL MOTOR, TANGENTIAL MOTOR ROTOR AND ROTOR IRON CORE THEREOF

CROSS-REFERENCE TO RELATED DISCLOSURE

This application is a U.S. National Stage of International Application No. PCT/CN2017/119434, filed on Dec. 28, 2017, and published as WO 2019/029109 on Feb. 14, 2019, which claims priority to the Chinese Application No. 201710676617.9, titled "Tangential Motor, Tangential Motor Rotor and Rotor Iron Core Thereof", filed on Aug. 9, 2017. Each application, publication, and patent listed in this paragraph are hereby incorporated by reference in their entireties.

TECHNICAL FIELD

The present disclosure relates to the technical field of motor equipment, and in particular, to a tangential motor, a tangential motor rotor, and a rotor iron core thereof.

BACKGROUND

As the tangential permanent magnet synchronous motor has the effect of "flux concentration", compared with the radial permanent magnet synchronous motor, the tangential permanent magnet synchronous motor can generate a higher air-gap magnetic flux density, which makes the motor have such advantages as a small size, a light weight, a large torque, a larger power density, high efficiency and good dynamic performance, etc. More and more tangential permanent magnet synchronous motors are applied in industrial fields such as servo systems and electric traction, and in household electric appliances.

At present, the air gap magnetic flux density and the counter electromotive force of the tangential permanent magnet synchronous motor contain various types of spatial harmonic waves. The stator of the tangential permanent-magnet synchronous motor is provided with slots, therefore the magnetic permeability of the magnetic circuit is uneven, and the air gap magnetic flux density and the counter electromotive force of the tangential permanent magnet synchronous motor contain various types of spatial harmonic waves, and the proportion of the harmonic waves is large. The interaction of various harmonic waves generates low-order force waves, which increases the vibration noise of the motor. The waveform has poor sine degree and a high distortion rate, thus making the motor's vibration and noise larger. The permanent magnets of the tangential permanent magnet motor are a parallel magnetic circuit structure, therefore the permanent magnet is prone to be caused a lower operating point and prone to be demagnetized under severe working conditions, which limits the application and popularization of the motor. In addition, the rotor iron core includes rotor punched segments, and the flux isolating holes in them are likely to cause a low mechanical strength.

Therefore, how to improve the mechanical strength and reduce the vibration noise of the motor is a problem to be solved urgently by those skilled in the art.

SUMMARY

In view of this, the present disclosure provides a rotor iron core to improve the mechanical strength and reduce the vibration noise of the motor. The present disclosure also provides a tangential motor rotor having the rotor iron core, and a tangential motor.

To achieve the above purpose, the present disclosure provides the following technical solutions:

a rotor iron core, including a rotor body and permanent magnet slots disposed on the rotor body; a fixing hole for fixing a rotor punched segment and a flux isolating hole are disposed on a rotor magnetic pole between two adjacent permanent magnet slots; the flux isolating hole is disposed outside the fixing hole in a radial direction of the rotor body; and a width of the flux isolating hole smoothly increases in a direction from an outer side of the rotor body toward a center thereof.

In an embodiment, in the above rotor iron core, the fixing hole and the flux isolating hole are both disposed on a center line of a magnetic pole of each of the permanent magnet slots.

In an embodiment, in the above rotor iron core, an outside wall of the flux isolating hole is a curved surface concentrical with the rotor body, and the outside wall of the flux isolating hole is adjacent to the outer side of the rotor body; a first flux barrier is formed between the outside wall of the flux isolating hole and an outer wall of the rotor body; a width of the first flux barrier is C; the rotor iron core engages with a stator through an air gap, and a length of the air gap is D;

$2.4 \geq C/D \geq 0.4.$

In an embodiment, in the above rotor iron core, $1.5 \geq C/D \geq 0.7$.

In an embodiment, in the above rotor iron core, the flux isolating hole is an axisymmetric structure, and an extension of a symmetry axis passes through a center of the rotor body.

In an embodiment, in the above rotor iron core, a width of an outside wall of the flux isolating hole is A, and an angle occupied by a single magnetic pole of the rotor iron core is B;

$0.15 \geq A/B \geq 0.02.$

In an embodiment, in the above rotor iron core, an angle formed by two lines respectively connecting a center of the rotor body and each of two end points G of an inside wall of the flux isolating hole is E;

$60° \geq E \geq 40°.$

In an embodiment, in the above rotor iron core, a length of the flux isolating hole in the radial direction of the rotor body is F, and a radius of the rotor body is R;

$0.4 \geq F/R \geq 0.1.$

In an embodiment, in the above rotor iron core, a minimum distance of an entity portion between the flux isolating hole and the fixing hole is greater than 1.5 mm; and/or, a minimum distance of an entity portion between the flux isolating hole and each of the permanent magnet slots is greater than 1.5 mm.

In an embodiment, in the above rotor iron core, an inside wall of the flux isolating hole is provided with a protrusion protruding toward an outer side of the rotor body, and the inside wall of the flux isolating hole is adjacent to a center of the rotor body.

In an embodiment, in the above rotor iron core, a vertex of the protrusion and a center line of the flux isolating hole intersect at an intersection M, and a distance from the intersection M to an outside wall of the flux isolating hole is H, and in the radial direction of the rotor body, a length of the flux isolating hole is F;

$0.5 \geq H/F \geq 0.3.$

In an embodiment, in the above rotor iron core, an inside wall of the flux isolating hole is provided with a concave groove, and the inside wall of the flux isolating hole is adjacent to a center of the rotor body, and the concave groove faces away from the outer side the rotor body.

In an embodiment, in the above rotor iron core, the concave groove is a sharp-pointed groove or a curved groove;

a vertex of the concave groove and a center line of the flux isolating hole intersect at an intersection M; a distance from the intersection M to an outside wall of the flux isolating hole is H, and the outside wall of the flux isolating hole is away from the center of the rotor body is H; and in the radial direction of the rotor body, a length of the flux isolating hole without the concave groove is F;

$1.4 \geq H/F > 1.$

In an embodiment, in the above rotor iron core, an inside wall of the flux isolating hole is a plane, and the inside wall of the flux isolating hole is adjacent to the center of the rotor body.

In an embodiment, in the above rotor iron core, each of the permanent magnet slots has an opening facing toward the outside of the rotor body, and a width of the opening is greater than half of a width of each of the permanent magnet slots.

In an embodiment, in the above rotor iron core, a maximum width of the flux isolating hole is more than twice a minimum width thereof;

and/or, a maximum width of the flux isolating hole is more than 1.5 times a diameter of the fixing hole.

The present disclosure further provides a tangential motor rotor, including a rotor iron core and tangentially magnetized permanent magnets disposed in permanent magnet slots, the rotor iron core is any one of the rotor iron cores.

In an embodiment, in the above tangential motor rotor, a first width of the tangentially magnetized permanent magnet is larger than a second width thereof, and the first width is adjacent to an outer side of the rotor iron core, and the second width is adjacent to a center of the rotor iron core.

The present disclosure further provides a tangential motor, including a tangential motor rotor and a stator, the tangential motor rotor is any one of the tangential motor rotors.

In an embodiment, in the above tangential motor, the stator has stator slots and slot openings facing an air gap between the tangential motor rotor and the stator; a width of each of the slot openings is K; a width of an outside wall of the flux isolating hole of the rotor iron core of the tangential motor rotor is A;

$1.2 \geq A/K \geq 0.8.$

As can be seen from above solutions, in the rotor iron core provided in the present disclosure, the fixing hole and the flux isolating hole are disposed on the rotor magnetic pole; the flux isolating hole is disposed outside the fixing hole in the radial direction of the rotor body. Through providing the fixing hole and providing a fixing member in the fixing hole, the mechanical strength of the rotor is effectively improved. Moreover, the width of the flux isolating hole smoothly increases in the direction from the outer side of the rotor body toward a center thereof, thereby effectively improving the magnetic flux direction of the rotor magnetic pole, increasing the air-gap magnetic flux density and the sine degree of the counter electromotive force, reducing the proportion of harmonic waves and the harmonic wave loss, reducing the vibration noise of the motor, and increasing the efficiency of the motor.

The present disclosure further provides the tangential motor rotor having the rotor iron core above, and the tangential motor. Since the above rotor iron core has the above technical effects, the tangential motor rotor having the above rotor iron core and the tangential motor should also have the same technical effects, which will not be described repeatedly herein.

BRIEF DESCRIPTION OF THE DRAWINGS

In order to make the content of the present disclosure easier to be understood clearly, the present disclosure will be further described in detail based on the specific embodiments with reference to the drawings of the present disclosure, wherein.

DETAILED DESCRIPTION OF THE EMBODIMENTS

The present disclosure discloses a rotor iron core, so as to improve mechanical strength and reduce vibration noise of a motor. The present disclosure also provides a tangential motor rotor having the rotor iron core, and provides a tangential motor The technical solutions in the embodiments of the present disclosure will be clearly and completely described below with reference to the drawings of the embodiments of the present disclosure. Obviously, the described embodiments are only a part of the embodiments of the present disclosure, but not all of the embodiments. Based on the embodiments of the present disclosure, other embodiments obtained by a person of the ordinary skill in the art without creative efforts all fall within the protection scope of the present disclosure.

Figure 1:
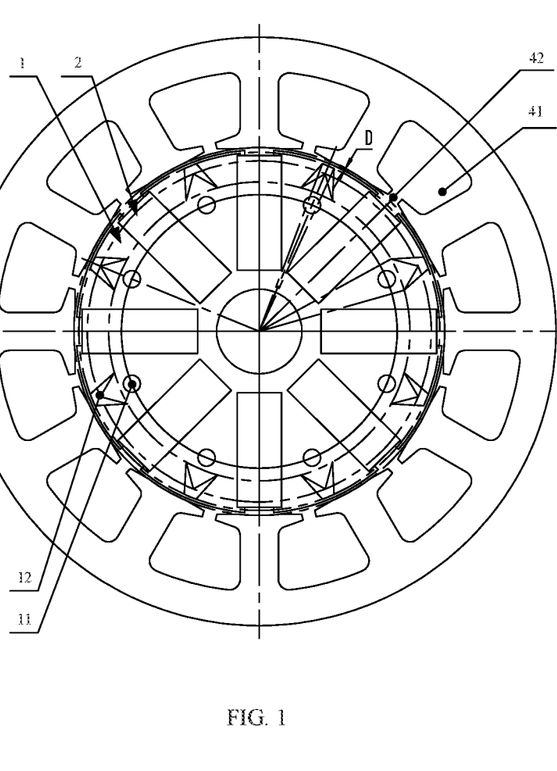
FIG. 1 is a schematic structural diagram of a tangential motor according to an embodiment of the present disclosure.
Figure 2:
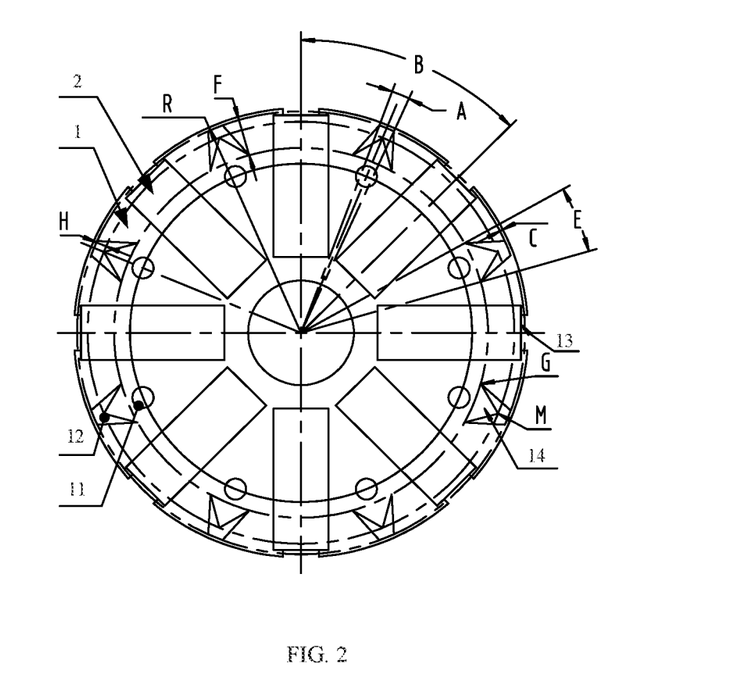
FIG. 2 is a schematic structural diagram of a first structure of the tangential motor rotor according to an embodiment of the present disclosure.

Referring to FIG. 1 and FIG. 2, an embodiment of the present disclosure provides a rotor iron core. The rotor iron core includes a rotor body 1 and permanent magnet slots 2 disposed on the rotor body 1; a fixing hole 11 for fixing a rotor punched segment and a flux isolating hole 12 are disposed on a rotor magnetic pole between two adjacent permanent magnet slots 2; the flux isolating hole 12 is disposed outside the fixing hole 11 in a radial direction of the rotor body 1, and a width of the flux isolating hole 12 smoothly increases in a direction from an outer side of the rotor body 1 toward a center thereof.

In the rotor iron core provided in the embodiment of the present disclosure, the fixing hole 11 and the flux isolating hole 12 are disposed on the rotor magnetic pole; the flux isolating hole 12 is disposed outside the fixing hole 11 in the radial direction of the rotor body 1. Through providing the fixing hole 11 and providing a fixing member in the fixing hole 11, the mechanical strength of the rotor is effectively improved. Moreover, the width of the flux isolating hole 12 smoothly increases in the direction from the outer side of the rotor body 1 toward a center thereof, thereby effectively improving the magnetic flux direction of the rotor magnetic pole, increasing the air-gap magnetic flux density and the sine degree of the counter electromotive force, reducing the proportion of harmonic waves and the harmonic wave loss, reducing the vibration noise of the motor, and increasing the efficiency of the motor.

It can be understood that the width of an entity portion of the magnetic pole between two flux isolating holes 12 is the distance between two sides of the entity portion of the magnetic pole in a direction perpendicular to a radial direction of the rotor body 1. The width of the flux isolating hole 12 is the distance between the walls at both ends of the flux isolating hole 12 in a direction perpendicular to a radial direction of the rotor body 1. Where, the fixing member is provided in the fixing hole 11. If the fixing hole 11 is a rivet hole, the fixing member is a rivet; if the fixing hole 11 is a screw hole, a structure reinforcing rod is configured to be inserted into the screw hole to connect the rotor punched segments. The fixing holes 11 can also be configured to be other types of holes, such as threaded holes, prismatic holes or oval holes, etc.

Preferably, the fixing hole 11 and the flux isolating hole 12 are both disposed on a center line of the magnetic pole of each of the permanent magnet slots 2. Through the above arrangement, the magnetic circuit structure of the motor is more symmetrical.

In an embodiment, the fixing hole 11 and the flux isolating hole 12 are both disposed on a center line of the magnetic pole of each of the permanent magnet slots 2. Through the above arrangement, the magnetic circuit structure of the motor is more symmetrical.

Figure 7:
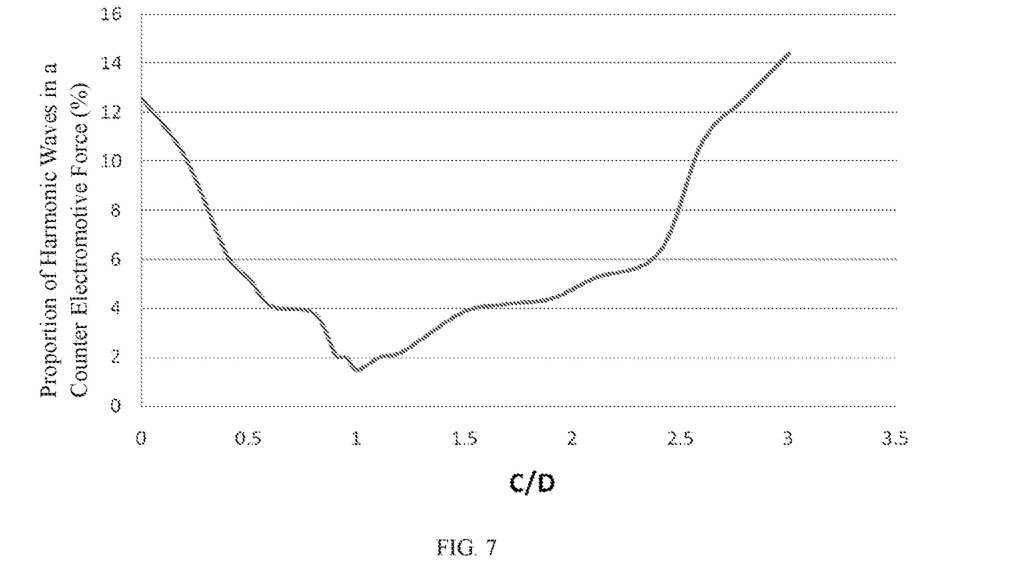
FIG. 7 is a schematic diagram illustrating a relationship between a proportion of harmonic waves in a counter electromotive force of the tangential motor and C/D according to an embodiment of the present disclosure.

In an embodiment, an outside wall of the flux isolating hole 12 is a curved surface concentrical with the rotor body 1, and the outside wall of the flux isolating hole is adjacent to the outer side of the rotor body 1, thus the outside wall of the flux isolating hole and the outer wall of the rotor iron core are parallel to each other. A first flux barrier is formed between the outside wall of the flux isolating hole 12 and the outer wall of the rotor body 1. A width of the first flux barrier is C. The rotor iron core engages with the stator through an air gap, and a length of the air gap is D. Through simulation research, it is found that a ratio of the width C of the first flux barrier to the length D of the air gap has a great influence on the proportion of harmonic waves in the counter electromotive force. As shown in FIG. 7, when the ratio C/D of the width C of the first flux barrier to the length D of the air gap is greater than or equal to 0.4, a small part of magnetic flux is prevented from passing through the first flux barrier, thereby improving a magnetic field distribution in the air gap, reducing the proportion of harmonic waves in the air-gap magnetic flux density, reducing the proportion of harmonic waves in the counter electromotive force, and reducing vibration noise. However, when the ratio C/D is greater than 2.4, the width of the first flux barrier is too large, thus too much magnetic flux is transmitted along the first flux barrier, and the wave form of the air-gap magnetic flux density is distorted. The proportion of harmonic waves is increased, and the vibration noise of the motor is increased. Therefore, $2.4 \geq C/D \geq 0.4$.

The outside wall of the flux isolating hole 12 is at a side radially closer to the outer wall of the rotor body 1, and the inside wall 121, 122, or 123 of the flux isolating hole 12 is at a side radially closer to the center of the rotor body 1.

In an embodiment, $1.5 \geq C/D \geq 0.7$. When $1.5 \geq C/D \geq 0.7$, the air-gap magnetic field distribution is optimal; a sine degree of the air-gap magnetic flux density is optimal; the proportion of harmonic waves in the air-gap magnetic flux density is the lowest; the proportion of harmonic waves in the counter electromotive force is the lowest; and the vibration noise of the motor is the lowest. Moreover, the harmonic wave loss is the smallest, and the efficiency of the motor is the highest. As shown in FIG. 7, under these conditions, the proportion of harmonic waves of the motor provided in this embodiment is less than 4%.

Further, the flux isolating hole 12 is an axisymmetric structure, and an extension of the symmetry axis passes through the center of the rotor body 1. In this embodiment, the flux isolating hole 12 is located at the center line of the magnetic pole.

In an embodiment, a width of the outside wall of the flux isolating hole 12 is A, and the angle occupied by a single magnetic pole of the rotor iron core is B. After research, it is found that when the width A of the flux isolating hole 12 is greater than 0.02 times the angle B (magnetic pole width) occupied by the single magnetic pole, the effect of the flux isolating hole 12 reducing the proportion of harmonic waves in the air-gap magnetic flux density is obvious. However, greater A/B is not always better. When A/B is greater than 0.15, the width of the flux isolating hole 12 is too large, and the magnetic flux at the center line of the rotor magnetic pole is too small, and the magnetic flux at both sides of the rotor magnetic pole is excessively concentrated. As a result, the air-gap magnetic field is unevenly distributed; the proportion of harmonic waves in the air-gap magnetic flux density and the proportion of harmonic waves in the counter electromotive force increase; the iron loss of the rotor iron core increases; the magnetic pole area is smaller; magnetic flux in the magnetic pole is easily saturated; the total magnetic flux is reduced; an output torque of the motor is reduced; and the efficiency of the motor is reduced. Therefore, in an embodiment, $0.15 \geq A/B \geq 0.02$.

Figure 8:
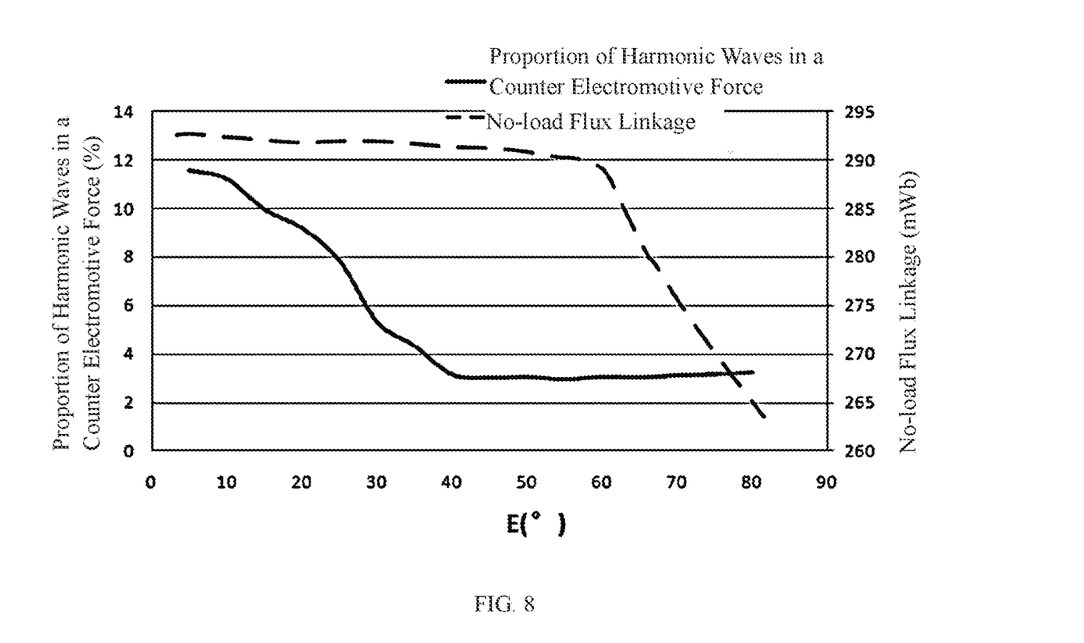
FIG. 8 is a diagram illustrating relationships between the proportion of harmonic waves in the counter electromotive force and no-load flux linkage of the tangential motor and E according to an embodiment of the present disclosure.

Further, an angle formed by two lines respectively connecting the center of the rotor body 1 and each of two end points G of the inside wall of the flux isolating hole 12 is E. Through simulation research, it is found that the angle E has a great influence on the proportion of harmonic waves in the counter electromotive force. The width of the inside wall of the flux isolating hole 12 is greater than the width of the outside wall thereof, thereby limiting the magnetic flux direction in the magnetic pole of the rotor. As shown in FIG. 8, when $E \geq 40°$, the air-gap magnetic flux distribution can be improved. The wave form of the air-gap magnetic flux density is more sinusoidal, and the proportion of the harmonic waves in the counter electromotive force is reduced, and the vibration noise of the motor is reduced; whereas when $E > 60°$, the flux isolating hole 12 will increasingly block the magnetic flux of the internal permanent magnets, causing a no-load flux linkage of the motor to drop. Therefore, 60°≥E≥40°. Where the above-mentioned angle is an electrical angle.

Since the wall of the flux isolating hole 12 adjacent to the center of the rotor iron core is the inside wall, the inside wall extends in a circumferential direction of the rotor iron core, and is symmetrical with respect to the center line of the magnetic pole. There are two end points G on the inside wall, and the distance between the two end points G on the inside wall is greater than the distance between two end points on the outside wall of the flux isolating hole 12.

Further, a length of the flux isolating hole 12 in the radial direction of the rotor body 1 is F, and a radius of the rotor body 1 is R; through simulation research, it is found that a ratio of the length F of the flux isolating hole 12 to the radius R of the rotor body 1 has a greater effect on harmonic waves. When F/R≥0.1, the increasing of the length F of the flux isolating hole 12 can limit a distribution of the magnetic flux in the rotor magnetic pole adjacent to the rotating shaft, thereby improving the air-gap magnetic field distribution, so that the proportion of harmonic waves in the gas-gap magnetic flux density and the proportion of the harmonic waves in the counter electromotive force decrease, and the vibration noise of the motor reduces; moreover, the flux isolating hole can weaken the demagnetizing armature reaction magnetic field when the motor is running, thereby improving the anti-demagnetization ability of the motor. However, when F/R>0.4, the length of the flux isolating hole is too large; the area of the flux isolating hole is too large; the area of the magnetically conductive magnetic pole is too small; the magnetic pole is easy to be saturated; the output capacity of the motor decreases, and the efficiency of the motor decreases. Therefore, in an embodiment 0.4≥F/R≥0.1.

In an embodiment, a minimum distance of an entity portion between the flux isolating hole 12 and the fixing hole 11 is greater than 1.5 mm. Through the above arrangement, the mechanical strength of the rotor structure of the motor can be improved.

Further, a minimum distance of an entity portion between the flux isolating hole 12 and each of the permanent magnet slots 2 is greater than 1.5 mm. Through the above arrangement, the mechanical strength of the rotor structure of the motor can be improved.

As shown in FIG. 2, in the first embodiment, the inside wall 121 of the flux isolating hole 12 is provided with a protrusion 14 protruding toward the outer side of the rotor body 1, and the inside wall 121 of the flux isolating hole is at the side radially closer to the center of the rotor body 1. By providing the protrusion 14, the flux isolating hole 12 can better adjust a distribution of the magnetic field of the permanent magnet at the inner side; moreover, the flux isolating hole 12 can be prevented from blocking the magnetic flux to the greatest extent, thereby improving the efficiency of the motor. The protrusion 14 can also facilitate the arrangement of the fixing hole 11 and the flux isolating hole 12, so that the fixing hole 11 can be moved toward the outer side of the rotor, thereby reducing the deformation of the outer side of the rotor caused by centrifugal forces and electromagnetic forces when the rotor rotates at high speed, and enhancing the mechanical strength of the rotor iron core.

In this embodiment, the protrusion 14 is a pointed protrusion. Of course, the protrusion 14 can also be set as a rounded protrusion or a polygonal protrusion.

Further, a vertex of the protrusion 14 and a center line of the flux isolating hole 12 intersect at an intersection M, and the distance from the intersection M to the outside wall of the flux isolating hole 12 is H, and the outside wall of the flux isolating hole 12 is away from the center of the rotor body 1, and in the radial direction of the rotor body 1, the length of the flux isolating hole 12 is F. In order to reduce the influence of the protrusion 14 of the flux isolating hole 12 on the proportion of harmonic waves in the air-gap magnetic flux density, the distance F between the vertex M of the protrusion 14 and the outside wall of the flux isolating hole 12 should not be too small. Therefore, 0.5≥H/F≥0.3. The above range can make the effect of reducing the proportion of harmonic waves in the air-gap magnetic flux density better, and the efficiency and mechanical strength of the motor are also guaranteed.

In another embodiment, the protrusion 14 may not be provided. The inside wall 122 of the flux isolating hole 12 is provided with a concave groove, and the inside wall 122 of the flux isolating hole is at the side radially closer to the center of the rotor body 1, and the concave groove faces away from the outer side the rotor body 1.

Figure 4:
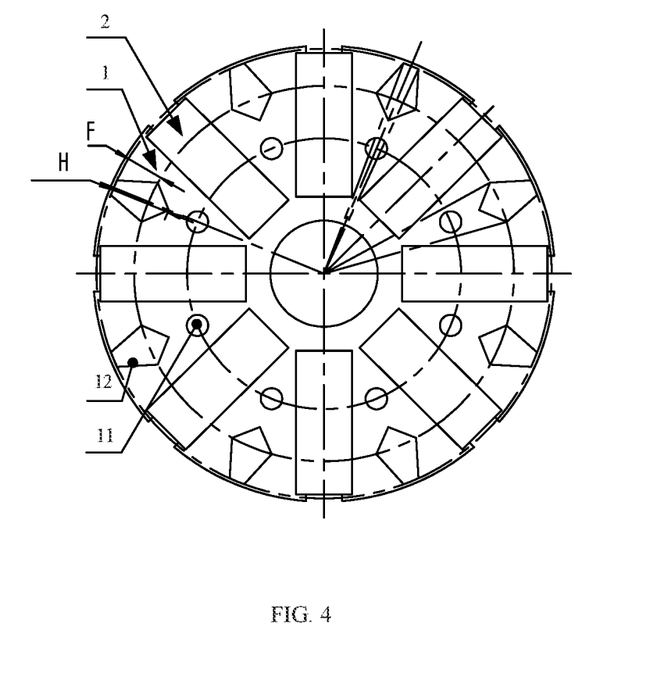
FIG. 4 is a schematic structural diagram of a third structure of the tangential motor rotor according to an embodiment of the present disclosure.
Figure 5:
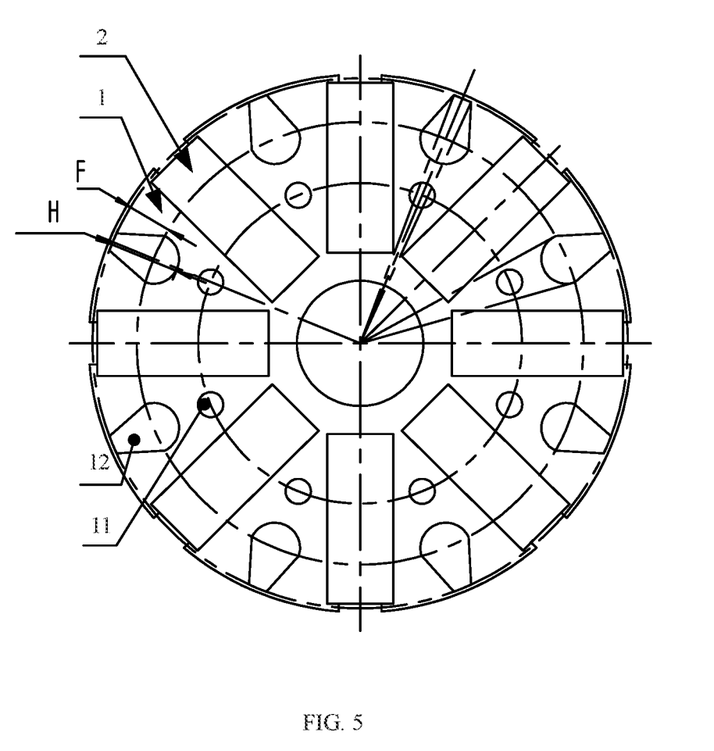
FIG. 5 is a schematic structural diagram of a fourth structure of the tangential motor rotor according to an embodiment of the present disclosure.

As shown in FIG. 4, the concave groove is a sharp-pointed groove. As shown in FIG. 5, the concave groove is a curved groove.

In the above two embodiments, the vertex of the concave groove and the center line of the flux isolating hole 12 intersect at the intersection M, and the distance from the intersection M to the outside wall of the flux isolating hole 12 is H, and the outside wall of the flux isolating hole is away from the center of the rotor body 1, and in the radial direction of the rotor body 1, the length of the flux isolating hole 12 without the concave groove is F. After research, it is found that when the flux isolating hole 12 is provided with the concave groove, the area of the flux isolating hole 12 is further increased; the effect of magnetic isolation is further improved; the magnetic flux transmitted along the center line of the magnetic pole is reduced; the magnetic flux transmitted along both sides of the magnetic pole is increased; the air-gap magnetic field is better distributed; the proportion of harmonic waves is smaller; the vibration noise is smaller, and the anti-demagnetization ability of the motor is further improved. In order to guarantee the mechanical strength, the depth of the concave groove should not be too large. Therefore, in an embodiment 1.4≥H/F>1. Where the vertex of the concave groove is a point closest to the center of rotor body 1.

Figure 3:
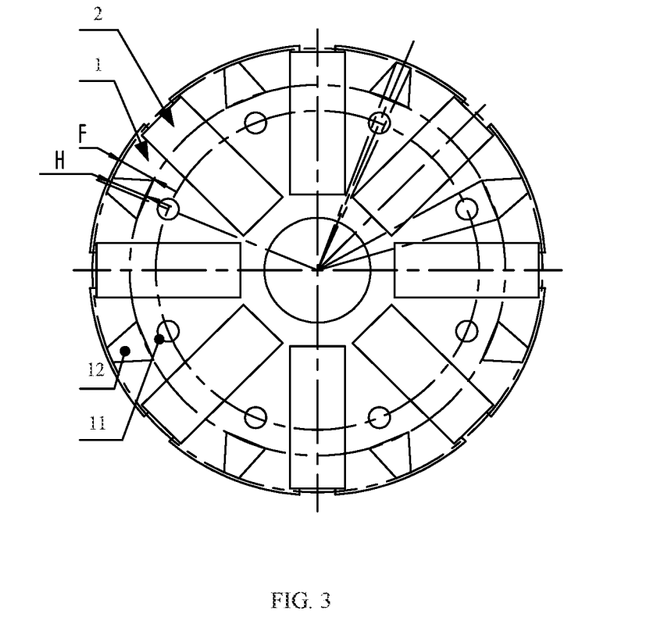
FIG. 3 is a schematic structural diagram of a second structure of the tangential motor rotor according to an embodiment of the present disclosure.

As shown in FIG. 3, in this embodiment, the inside wall 123 of the flux isolating hole 12 defines a plane, and the inside wall 123 of the flux isolating hole is at the side radially closer to the center of the rotor body 1. Where the inside wall 123 of the flux isolating hole 12 defines the plane, and the flux isolating hole 12 is in a shape of a trapezoid, that is, H=F.

In an embodiment, each of the permanent magnet slots 2 has an opening 13 facing toward the outside of the rotor body 1, and a width of the opening 13 is greater than half of a width of each of the permanent magnet slots. Through the above arrangement, the magnetic leakage at the end of the tangentially magnetized permanent magnet can be effectively reduced, and the efficiency of the motor is improved. The width of the opening 13 is a distance of the opening 13 perpendicular to the radial direction of the rotor body 1.

In an embodiment, a maximum width of the flux isolating hole 12 is more than twice a minimum width thereof. The maximum width of the flux isolating hole 12 is the width of a side of the flux isolating hole 12, which is adjacent to the center of the rotor core. The minimum width of the flux isolating hole 12 is the width of a side of the flux isolating hole 12, which is away from the center of the rotor core.

Through the above arrangement, the proportion of the harmonic waves in the air-gap magnetic flux density is better reduced.

The maximum width of the flux isolating hole 12 is more than 1.5 times a diameter of the fixing hole 11. The width of the flux isolating hole 12 smoothly increases from the outside to the inside of the rotor, and the maximum width is greater than 1.5 times the diameter of the fixing hole 11, thus the flow of the reverse magnetic field of the stator can be effectively guided, thereby reducing the reverse magnetic field of the stator entering the rotor, and reducing the risk of demagnetization of the permanent magnets at the inner side under severe operating conditions.

The embodiments of the present disclosure further provide a tangential motor rotor, including a rotor iron core and tangentially magnetized permanent magnets disposed in permanent magnet slots. The rotor iron core is any one of the above rotor iron cores. Since the above rotor iron cores have the above technical effects, the tangential motor rotor having the above rotor iron core should also have the same technical effects, which are not described repeatedly herein.

Further, a first width of the tangentially magnetized permanent magnet is larger than a second width thereof, and the first width is adjacent to the outer side of the rotor iron core, and the second width is adjacent to the center of the rotor iron core. Through the above arrangement, the anti-demagnetization ability of the motor can be effectively improved.

The embodiments of the present disclosure further provide a tangential motor including a tangential motor rotor and a stator. The tangential motor rotor is any one of the tangential motor rotors above. Since the above tangential motor rotors have the above technical effects, the tangential motor having the above tangential motor rotor should also has the same technical effects, which are not described repeatedly herein.

Figure 6:
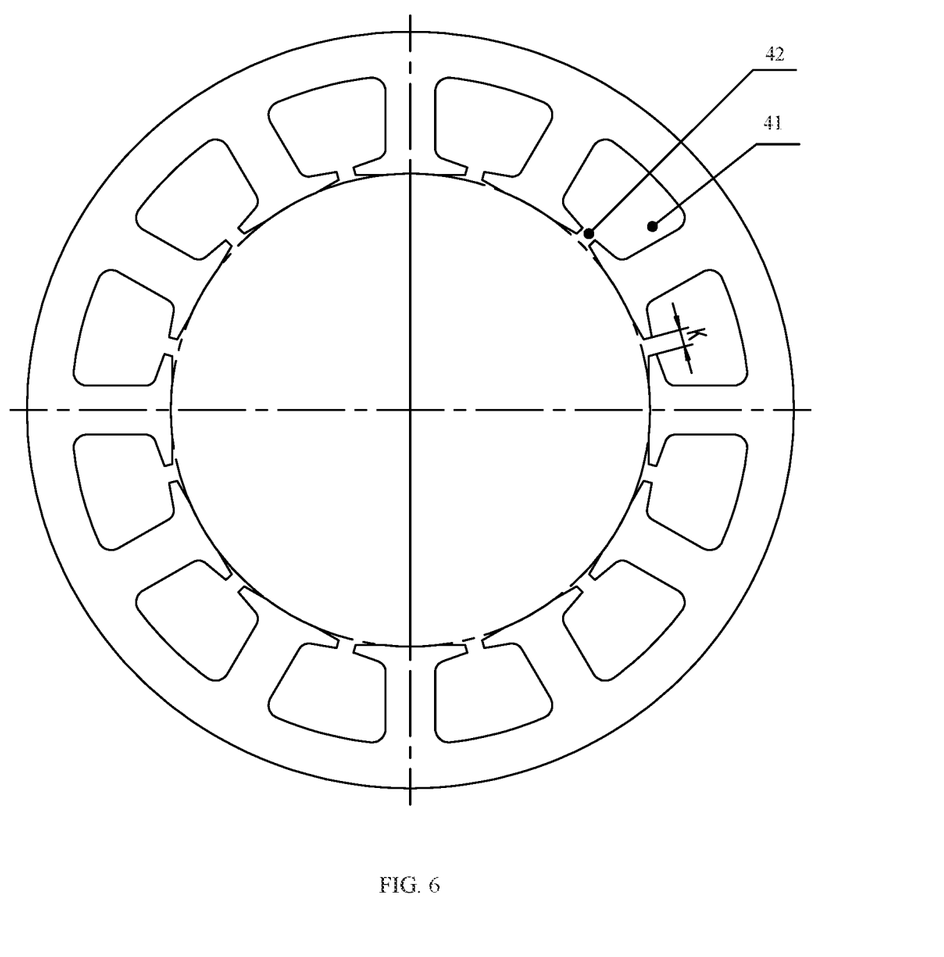
FIG. 6 is a schematic structural diagram of a stator according to an embodiment of the present disclosure.
Figure 9:
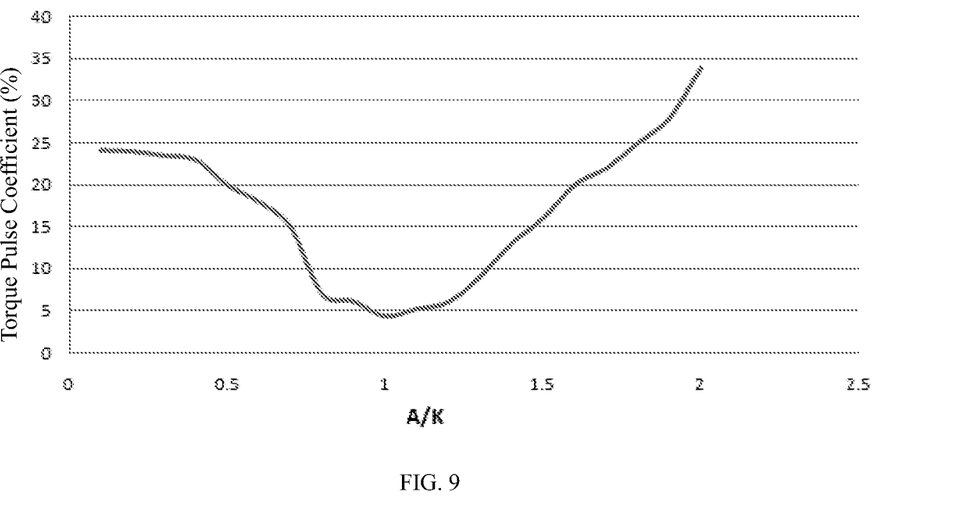
FIG. 9 is a diagram illustrating a relationship between a torque pulse coefficient of the tangential motor and A/K according to an embodiment of the present disclosure.

As shown in FIGS. 2 and 6, the stator has stator slots 41 and slot openings 42 facing an air gap between the tangential motor rotor and the stator. A width of each of the slot openings 42 is K. A width of the outside wall of the flux isolating hole 12 of the rotor iron core of the tangential motor rotor is A. As shown in FIG. 9, the ratio of the width A of the outside wall of the flux isolating hole 12 of the rotor iron core of the tangential motor rotor to the width K of the slot opening 42 is configured to be 1.2≥A/K≥0.8, which can effectively reduce the proportions of the 5th and the 7th harmonic waves in the air-gap magnetic flux density, thereby reducing the torque pulsation of the motor caused by the 5th and the 7th harmonic waves acting on the fundamental magnetic field.

The technical features of the embodiments described above can be arbitrarily combined. In order to simplify the description, possible combinations of the technical features in the above embodiments are not all described. However, as long as there are no contradictions between the combinations of these technical features, the combinations of these technical features should be considered within the scope described in this description.

The above descriptions are merely the preferred embodiments of the present disclosure, and the descriptions thereof are more specific and detailed, but not intended to limit the protection scope of the present disclosure. It should be noted that, for those skilled in the art, various deformations and improvements made without departing from the conception of the present disclosure are included within the protection scope of the present disclosure. Therefore, the protection scope of the present disclosure should be subject to the appended claims.

What is claimed is:

1. A rotor iron core, comprising a rotor body and a plurality of permanent magnet slots disposed on the rotor body, wherein:
    a fixing hole for fixing a rotor punched segment and a flux isolating hole are configured to be disposed on a rotor magnetic pole between two adjacent permanent magnet slots; the flux isolating hole is disposed outside the fixing hole in a radial direction of the rotor body; a width of the flux isolating hole smoothly increases in a direction from an outer side of the rotor body toward a center thereof;
    an angle formed by two lines respectively connecting the center of the rotor body and each of two end points G of an inside wall of the flux isolating hole is E; and $60° \geq E \geq 40°$.

2. The rotor iron core of claim 1, wherein the fixing hole and the flux isolating hole are both configured to be disposed on a center line of a magnetic pole of each of the plurality of permanent magnet slots.

3. The rotor iron core of claim 1, wherein an outside wall of the flux isolating hole is a curved surface concentric with the rotor body, and the outside wall of the flux isolating hole is at a side of the flux isolating hole radially closer to the outer side of the rotor body;
    wherein a first flux barrier is formed between the outside wall of the flux isolating hole and an outer wall of the rotor body; a width of the first flux barrier is C; the rotor iron core engages with a stator through an air gap, and a length of the air gap is D; and $2.4 \geq C/D \geq 0.4$.

4. The rotor iron core of claim 3, wherein $1.5 \geq C/D \geq 0.7$.

5. The rotor iron core of claim 1, wherein the flux isolating hole is an axisymmetric structure, and an extension of a symmetry axis passes through the center of the rotor body.

6. The rotor iron core of claim 1, wherein a length of the flux isolating hole in the radial direction of the rotor body is F, and a radius of the rotor body is R; and $0.4 \geq F/R \geq 0.1$.

7. The rotor iron core of claim 1, wherein a minimum distance of an entity portion between the flux isolating hole and the fixing hole is greater than 1.5 mm;
    or, a minimum distance of an entity portion between the flux isolating hole and each of the plurality of permanent magnet slots is greater than 1.5 mm.

8. The rotor iron core of claim 1, wherein an inside wall of the flux isolating hole is provided with a protrusion protruding toward the outer side of the rotor body, and the inside wall of the flux isolating hole is at a side of the flux isolating hole radially closer to the center of the rotor body.

9. The rotor iron core of claim 8, wherein a vertex of the protrusion and a center line of the flux isolating hole intersect at an intersection M, and a distance from the intersection M to an outside wall of the flux isolating hole is H, and in the radial direction of the rotor body, a length of the flux isolating hole is F; and $0.5 \geq H/F \geq 0.3$.

10. The rotor iron core of claim 1, wherein an inside wall of the flux isolating hole is provided with a concave groove, and the inside wall of the flux isolating hole is at a side of the flux isolating hole radially closer to a center of the rotor body, and the concave groove faces away from the outer side of the rotor body.

11. The rotor iron core of claim 10, wherein the concave groove is a sharp-pointed groove or a curved groove;
wherein a vertex of the concave groove and a center line of the flux isolating hole intersect at an intersection M; a distance from the intersection M to an outside wall of the flux isolating hole is H, and the outside wall of the flux isolating hole is at another side of the flux isolating hole radially farther from the center of the rotor body than the intersection M; and in the radial direction of the rotor body, a length of the flux isolating hole without the concave groove is F; and $1.4 \geq H/F > 1$.

12. The rotor iron core of claim 1, wherein an inside wall of the flux isolating hole defines a plane, and the inside wall of the flux isolating hole is at a side closer to the center of the rotor body.

13. The rotor iron core of claim 1, wherein each of the plurality of permanent magnet slots has an opening facing toward the outer side of the rotor body, and a width of the opening is greater than half of a width of each of the plurality of permanent magnet slots.

14. The rotor iron core of claim 1, wherein a maximum width of the flux isolating hole is more than twice a minimum width thereof;
or, a maximum width of the flux isolating hole is more than 1.5 times a diameter of the fixing hole.

15. A tangential motor rotor, comprising a rotor iron core and tangentially magnetized permanent magnets disposed in the plurality of permanent magnet slots, wherein the rotor iron core is the rotor iron core of claim 1.

16. The tangential motor rotor of claim 15, wherein a first width of the tangentially magnetized permanent magnet is larger than a second width thereof, and the first width is proximate to an outer side of the rotor iron core, and the second width is proximate to a center of the rotor iron core.

17. A tangential motor, comprising a tangential motor rotor and a stator, wherein the tangential motor rotor is the tangential motor rotor of claim 15.

18. The tangential motor of claim 17, wherein the stator has a plurality of stator slots and a plurality of slot openings facing an air gap between the tangential motor rotor and the stator; a width of each of the plurality of slot openings is K; a width of an outside wall of the flux isolating hole of the rotor iron core of the tangential motor rotor is A; and $1.2 \geq A/K \geq 0.8$.

19. A rotor iron core, comprising a rotor body and a plurality of permanent magnet slots disposed on the rotor body, wherein:
a fixing hole for fixing a rotor punched segment and a flux isolating hole are configured to be disposed on a rotor magnetic pole between two adjacent permanent magnet slots; the flux isolating hole is disposed outside the fixing hole in a radial direction of the rotor body; a width of the flux isolating hole smoothly increases in a direction from an outer side of the rotor body toward a center thereof;
a length of the flux isolating hole in the radial direction of the rotor body is F, and a radius of the rotor body is R; and $0.4 \geq F/R \geq 0.1$.

20. A rotor iron core, comprising a rotor body and a plurality of permanent magnet slots disposed on the rotor body, wherein:
a fixing hole for fixing a rotor punched segment and a flux isolating hole are configured to be disposed on a rotor magnetic pole between two adjacent permanent magnet slots; the flux isolating hole is disposed outside the fixing hole in a radial direction of the rotor body; a width of the flux isolating hole smoothly increases in a direction from an outer side of the rotor body toward a center thereof;
a vertex of a protrusion of the flux isolating hole and a center line of the flux isolating hole intersect at an intersection M, and a distance from the intersection M to an outside wall of the flux isolating hole is H, and in the radial direction of the rotor body, a length of the flux isolating hole is F; and $0.5 \geq H/F \geq 0.3$.

* * * * *